United States Patent
Kim et al.

(10) Patent No.: US 11,184,605 B2
(45) Date of Patent: Nov. 23, 2021

(54) METHOD AND DEVICE FOR OPERATING A LENTICULAR DISPLAY

(71) Applicant: Apple Inc., Cupertino, CA (US)

(72) Inventors: Seung Wook Kim, San Jose, CA (US); Nicolas V. Scapel, Sunnyvale, CA (US); Felipe Bacim De Arujo E Silva, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/922,350

(22) Filed: Jul. 7, 2020

(65) Prior Publication Data
US 2021/0099692 A1    Apr. 1, 2021

Related U.S. Application Data

(60) Provisional application No. 62/906,946, filed on Sep. 27, 2019.

(51) Int. Cl.
*H04N 13/368* (2018.01)
*G06T 7/70* (2017.01)
*H04N 13/305* (2018.01)

(52) U.S. Cl.
CPC ............ *H04N 13/368* (2018.05); *G06T 7/70* (2017.01); *H04N 13/305* (2018.05); *G06T 2207/30196* (2013.01)

(58) Field of Classification Search
CPC .. G02B 27/0093; G02B 30/28; H04N 13/305; H04N 13/368; H04N 21/816; H04N 21/4223; H04N 2013/403; G06T 7/70; G06T 2207/30196
See application file for complete search history.

(56) References Cited

U.S. PATENT DOCUMENTS

| | | | |
|---|---|---|---|
| 9,294,670 B2 | 3/2016 | Jafarzadeh et al. | |
| 2006/0268240 A1* | 11/2006 | Miles | G06F 3/1446 353/94 |
| 2009/0146915 A1 | 6/2009 | Marathe | |
| 2012/0200676 A1 | 8/2012 | Huitema et al. | |
| 2016/0219268 A1* | 7/2016 | Strom | H04N 13/349 |
| 2018/0224661 A1* | 8/2018 | Hibino | G02B 3/0056 |

OTHER PUBLICATIONS

Andrew V. Jones et al., "Interpolating Vertical Parallax for an Autostereoscopic 3D Projector Array", Journal of Electronic Imaging, 23(1), 2014, pp. 1-20.

* cited by examiner

*Primary Examiner* — Peet Dhillon

(74) *Attorney, Agent, or Firm* — Fernando & Partners, LLP

(57) ABSTRACT

In one implementation, a method of operating a lenticular display is performed by a device including a processor, non-transitory memory, an image sensor, and a lenticular display. The method includes displaying, via the lenticular display, first content at a horizontal angle of a first user and second content, different than the first content, at a horizontal angle of a second user. The method further includes displaying, via the lenticular display, the first content at a second horizontal angle of the first user and the second content at a second horizontal angle of the second user.

20 Claims, 8 Drawing Sheets

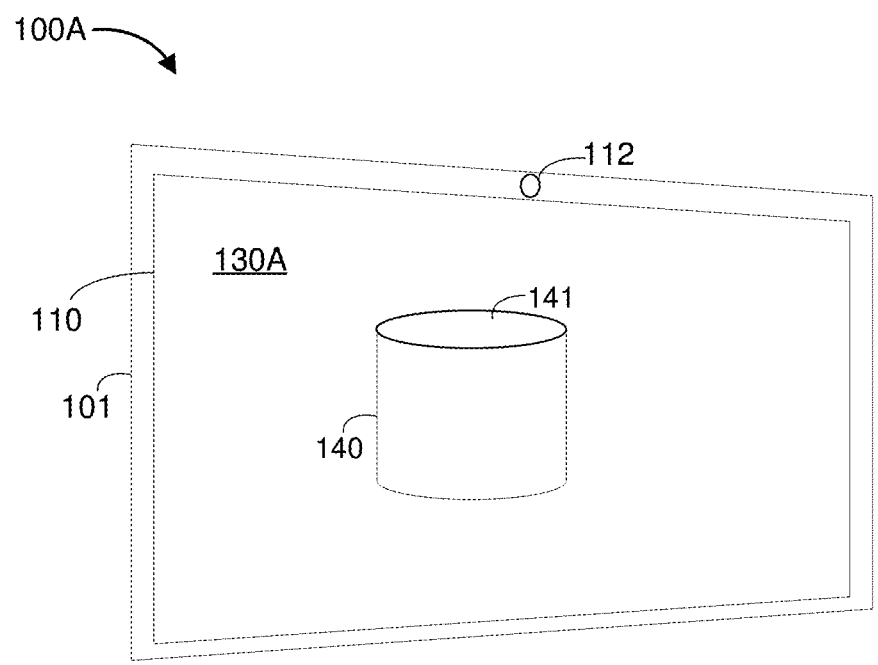
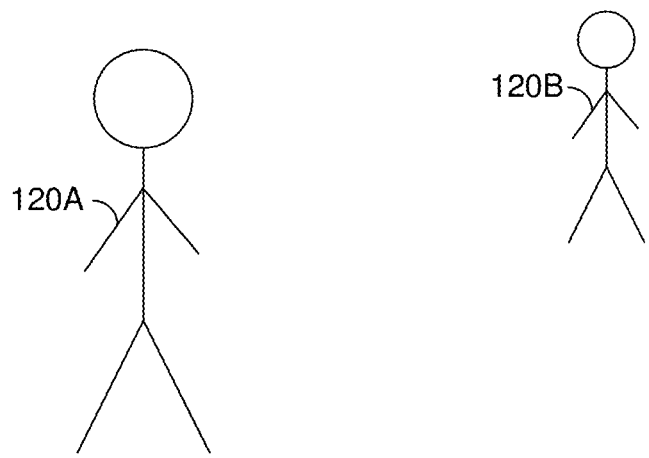
Figure 2

900

| 910 | At a device including one or more processors, non-transitory memory, an image sensor, and a display:<br><br>Capturing, using the image sensor, a first image |

↓

| 920 | Determining, from the first image, a first horizontal angle of a first user at a first time with respect to the lenticular display and a first horizontal angle of a second user at the first time with respect to the lenticular display |

↓

| 930 | Displaying, via the lenticular display, first content at the first horizontal angle of the first user and second content, different than the first content, at the first horizontal angle of the second user |

↓

| 940 | Determining a second horizontal angle of the first user at a second time, different than the first time, with respect to the lenticular display and a second horizontal angle of the second user at the second time with respect to the lenticular display |

↓

| 950 | Displaying, via the lenticular display, the first content at the second horizontal angle of the first user and the second content at the second horizontal angle of the second user |

Figure 9

METHOD AND DEVICE FOR OPERATING A LENTICULAR DISPLAY

CROSS-REFERENCE TO RELATED APPLICATIONS

This application claims priority to U.S. Provisional Patent App. No. 62/906,946, filed on Sep. 27, 2019, which is hereby incorporated by reference in its entirety.

TECHNICAL FIELD

The present disclosure generally relates to lenticular displays and, in particular, to systems, methods, and devices for displaying different content to different users via a lenticular display.

BACKGROUND

Lenticular displays are capable displaying different content at different angles. For example, when viewing a lenticular display from a first angle, a video clip is seen and when viewing the lenticular display from a second angle, a different video clip is seen.

Whereas some lenticular displays display different content at different angles, it may be desirable to display different content to different users while the users move with respect to the lenticular display.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 illustrates a second perspective view of the example operating environment at the first time.

FIG. 9 is a flowchart representation of a method of operating a lenticular display in accordance with some implementations.

Figure 1:
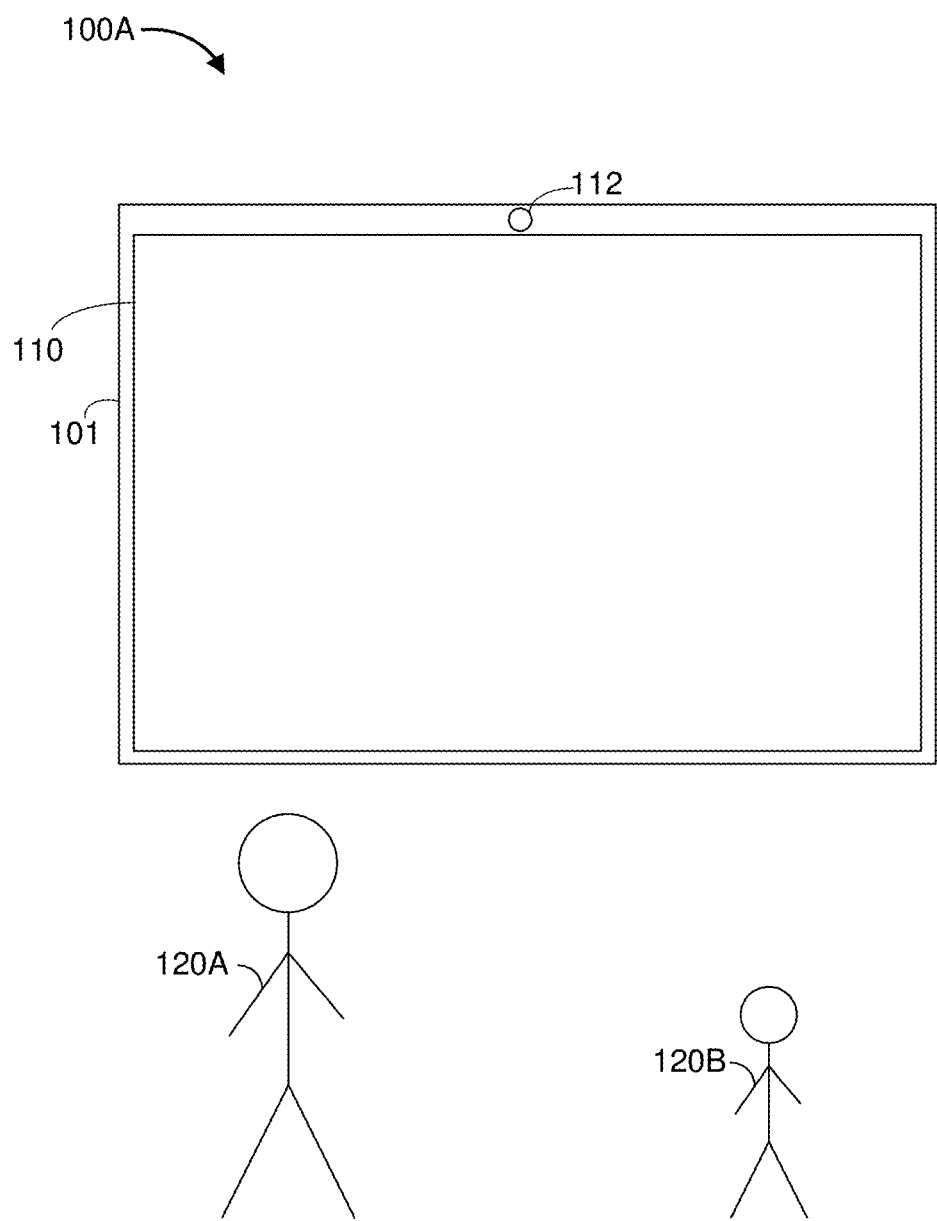
FIG. 1 illustrates a first perspective view of an example operating environment at a first time.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying different content to different users via a lenticular display. In various implementations, a method is performed at a device including a processor, non-transitory memory, an image sensor, and a lenticular display. The method includes capturing, using the image sensor, a first image. The method includes determining, from the first image, a first horizontal angle of a first user with respect to a line perpendicular to the lenticular display and a first horizontal angle of a second user with respect to the line perpendicular to the lenticular display. The method includes displaying, via the lenticular display, first content at the first horizontal angle of the first user and second content at the first horizontal angle of the second user. The method includes capturing, using the image sensor, a second image. The method includes determining, from the second image, a second horizontal angle of the first user with respect to the line perpendicular to the lenticular display and a second horizontal angle of the second user with respect to the line perpendicular to the lenticular display. The method includes displaying, via the lenticular display, the first content at the second horizontal angle of the first user and the second content at the second horizontal angle of the second user.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

Lenticular displays are capable displaying different content at different angles. For example, when viewing a lenticular display from a first angle, a video clip is seen and when viewing the lenticular display from a second angle, a different video clip is seen.

In various implementations, a lenticular display includes a matrix of pixels over which a lenticular lens pattern is laid. In various implementations, a first set of the matrix of pixels is visible from a first angle, a second set of the matrix of pixels is visible from a second angle, a third set of pixels is visible from a third angle, and so on.

In various implementations described below, this feature of lenticular displays is used to present different content to different users as they move with respect to the lenticular display. For example, in various implementations, a first user and a second user are tracked by an image sensor and first content and second content are displayed to the first user and the second user at whatever angle they are with respect to the lenticular display.

FIG. 1 illustrates a first perspective view of an example operating environment at a first time 100A. The example operating environment at the first time 100A includes an electronic device 101 having an image sensor 112 and a lenticular display 110. The example operating environment at the first time 100A includes a first user 120A and a second user 120B of different heights viewing the lenticular display. At the first time, the first user 120A is at a first location and the second user 120B is at a second location.

Although FIG. 1 illustrates only two users in the example operating environment, in various implementations, any number of users may be present in the example operating environment and have different content presented thereto.

FIG. 2 illustrates a second perspective view of the example operating environment at the first time 100A. The second perspective view is illustrated from a position behind the first user 120A looking towards the device 101. From this angle, first content 130A can be seen on the lenticular display 110. The first content 130A includes a cylinder 140 viewed from particular vertical angle. At the particular vertical angle, the top 141 of the cylinder 140 can be seen.

Figure 3:
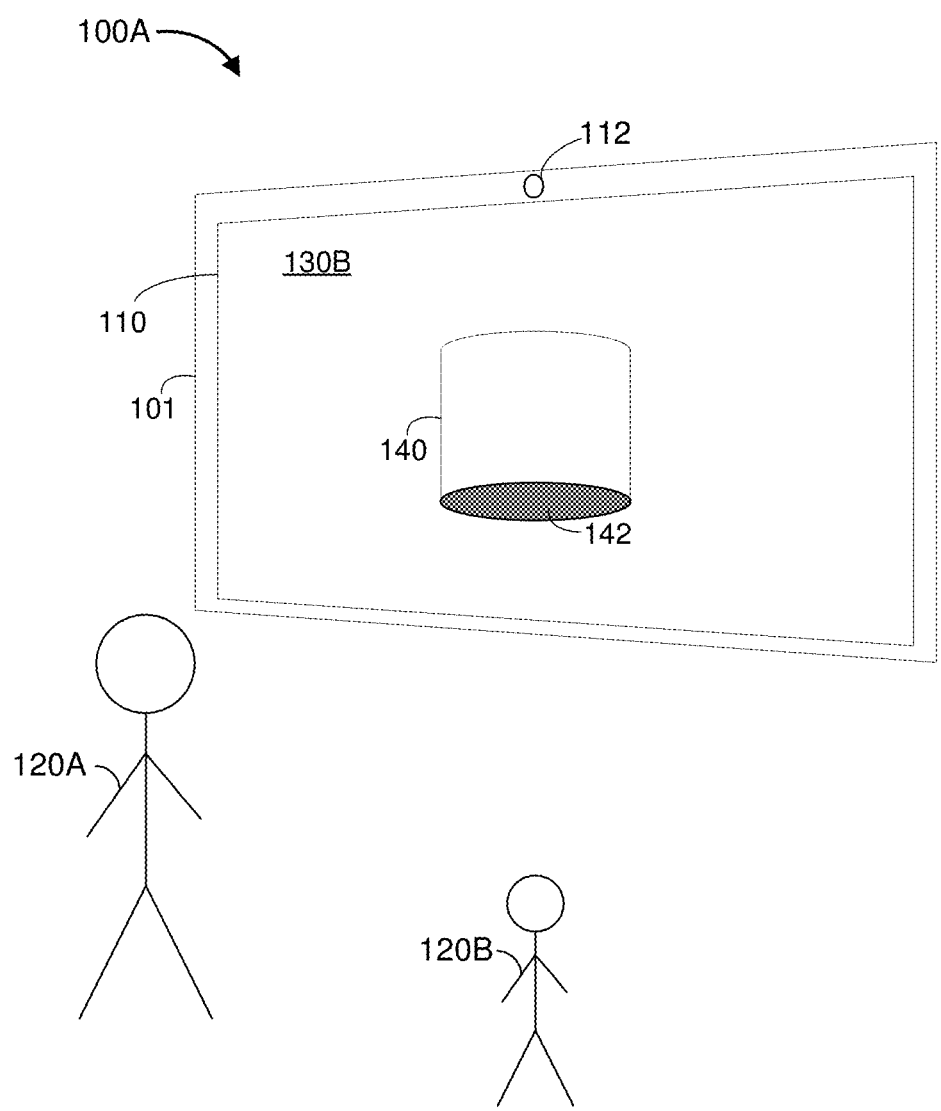
FIG. 3 illustrates a third perspective view of the example operating environment at the first time.

FIG. 3 illustrates a third perspective view of the example operating environment at the first time 110A. The third perspective view is illustrated from a position behind the second user 120B looking towards the device 101. From this angle, second content 130B can be seen on the lenticular display 110. The second content 130B includes the same cylinder 140 viewed from a different vertical angle. At the different vertical angle, the top 141 of the cylinder 140 cannot be seen. However, at the different vertical angle, the bottom 142 of the cylinder 140 can be seen.

In various implementations, the first content 130A and the second content 130B are two different images. In various implementations, the first content 130A and the second content 130B are two different videos. In various implementations, the first content 130A and the second content 130B are different versions of the same underlying content. For example, the second content 130B may be a censored version of the first content 130A.

In various implementations, the first content 130A and/or second content 130B is based on metadata regarding the user viewing the content. For example, if the first user 120A is associated with metadata indicating that the first user 120A has permission to view certain content, but that second user 120B is not associated with metadata indicating that the second user 120B has permission to view the certain content, the first content 130A may include that certain content whereas the second content 130A may not include that certain content, but rather, other content. For example, the first user 120A may be associated with metadata indicating that the first user 120A has permission to watch television shows rated TV-MA or less, whereas the second user 120B is associated with metadata indicating that the second user 120B has permission to watch television shows rated TV-PG or less. Thus, the first content 130A may include a TV-MA rated television show and the second content may include a different show (rated TV-PG or less) or a censored version of the TV-MA rated television show.

In various implementations, as in FIGS. 2 and 3, the first content 130A and the second content 130A are different perspective views of the same object or scene. In various implementations, the object is a virtual object. In various implementations, the object is a three-dimensional object. In various implementations, the scene is a virtual scene. In various implementations, the scene is a three-dimensional scene.

Figure 4:
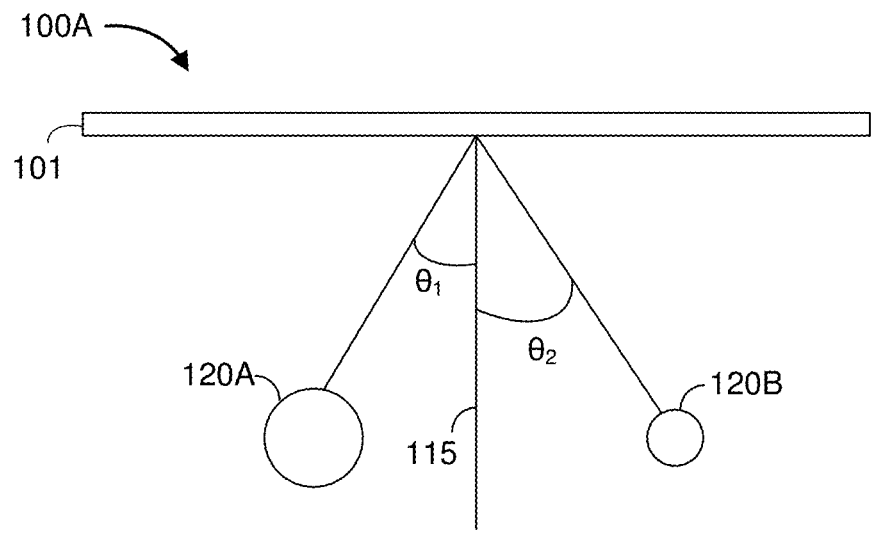
FIG. 4 illustrates a top view of the example operating environment at the first time.

FIG. 4 illustrates a top view of the example operating environment at the first time 100A. The device 101 determines a first horizontal angle ($\theta_1$) of the first user 120A with respect to a line 115 perpendicular to the lenticular display 110 and a second horizontal angle ($\theta_2$) of the second user 120B with respect to the line 115 perpendicular to the lenticular display 110. In FIG. 4, the first horizontal angle ($\theta_1$) is approximately −30 degrees and the second horizontal angle ($\theta_2$) is approximately 45 degrees.

In various implementations, the device 101 determines the first horizontal angle ($\theta_1$) and the second horizontal angle ($\theta_2$) using the image sensor 112 to capture an image of the first user 120A and the second user 120B and detecting the first user 120A and the second user 120B in the captured image. The device 101 controls the lenticular display 110 to display the first content 130A at the first horizontal angle ($\theta_1$) (e.g., to the first user 120A) and the second content 130B at the second horizontal angle ($\theta_2$) (e.g., to the second user 120B).

Figure 5:
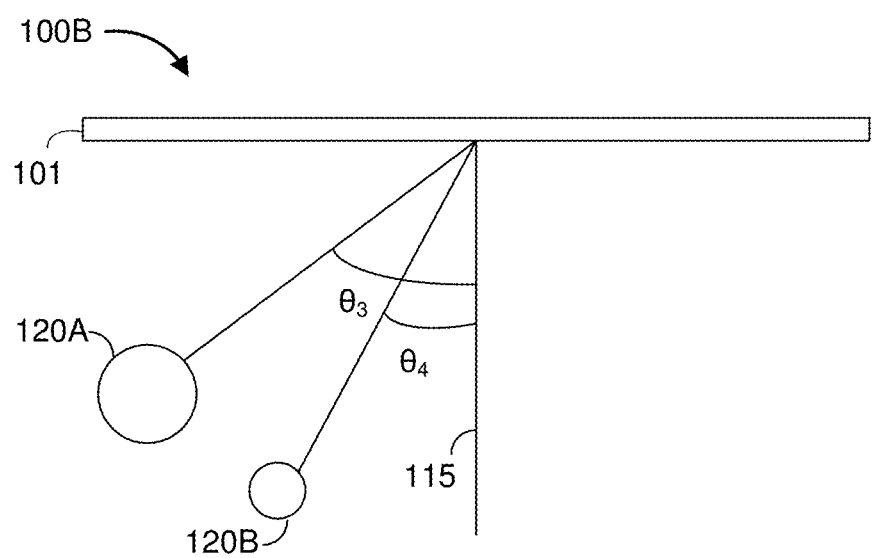
FIG. 5 illustrates a top view of the example operating environment at a second time.

FIG. 5 illustrates a top view of the example operating environment at a second time 100B. At the second time, the first user 120A has moved from the first position to a third position and the second user 120B has moved from the second position to a fourth position. The device 101 determines a third horizontal angle ($\theta_3$) of the first user 120A with respect to the line 115 perpendicular to the lenticular display 110 and a fourth horizontal angle ($\theta_4$) of the second user 120B with respect to the line 115 perpendicular to the lenticular display 110. In FIG. 5, the third horizontal angle ($\theta_3$) is approximately −60 degrees and the fourth horizontal angle ($\theta_4$) is approximately −30 degrees.

The device 101 controls the lenticular display 110 to display the first content 130A at the third horizontal angle ($\theta_3$) (e.g., to the first user 120A) and the second content 130B at the fourth horizontal angle ($\theta_4$) (e.g., to the second user 120B). Thus, even though the first horizontal angle ($\theta_1$) and the fourth horizontal angle ($\theta_4$) are, coincidentally, the same, different content is displayed at that angle at the first time (e.g., the first content 130A to the first user 120A) and the second time (e.g., the second content 130B to the second user 120B).

Figure 6:
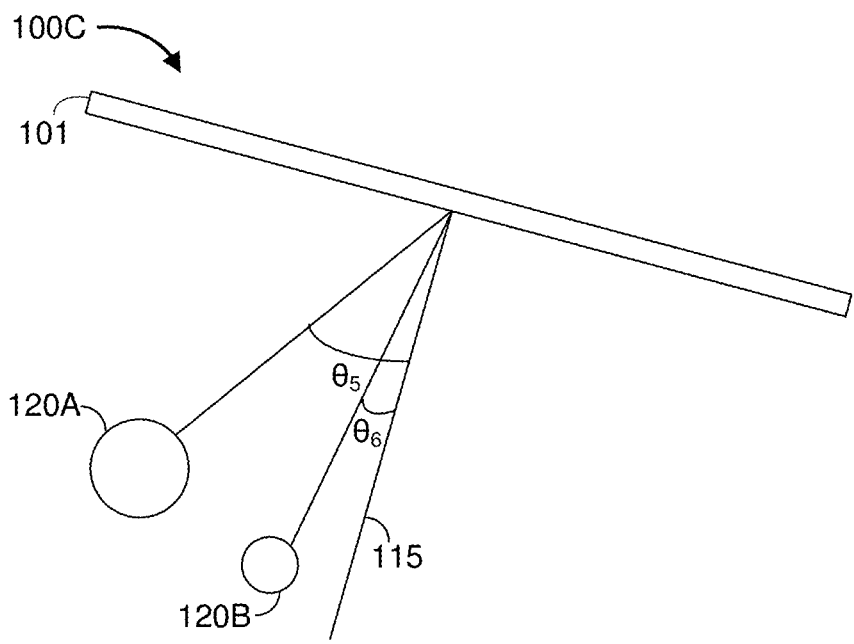
FIG. 6 illustrates a top view of the example operating environment at a third time.

FIG. 6 illustrates a top view of the example operating environment at a third time 100C. At the third time, the first user 120A remains at the third position and the second user 120B remains at the fourth position. However, the device 101 has moved (e.g., rotated), changing the horizontal angles of the users with respect to the line 115 perpendicular to the lenticular display 110.

The device 101 determines a fifth horizontal angle ($\theta_5$) of the first user 120A with respect to the line 115 perpendicular to the lenticular display 110 and a sixth horizontal angle ($\theta_6$) of the second user 120B with respect to the line 115 perpendicular to the lenticular display 110. In various implementations, the device 101 determines the fifth horizontal angle ($\theta_5$) and the sixth horizontal angle ($\theta_6$) based on data from a pose estimation unit of the device 101, such as an inertial measurement unit (IMU), IR encoder, or potentiometer. In FIG. 6, the third horizontal angle ($\theta_3$) is approximately −45 degrees and the fourth horizontal angle ($\theta_4$) is approximately −15 degrees. The device 101 controls the lenticular display 110 to display the first content 130A at the fifth horizontal angle ($\theta_5$) (e.g., to the first user 120A) and the second content 130B at the sixth horizontal angle ($\theta_6$) (e.g., to the second user 120B).

Figure 7:
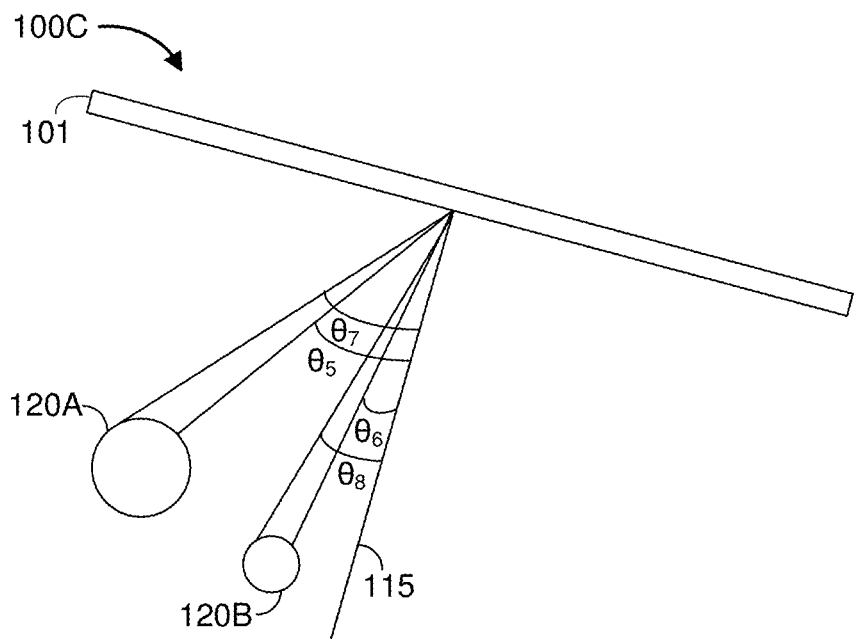
FIG. 7 illustrates a top view of the example operating environment at the third time in which each eye of each user is presented different content.

FIG. 7 illustrates a top view of the example operating environment at the third time 100C in which each eye of each user is presented different content. At the third time, the first user 120A remains at the third position, the second user 120B remains at the fourth position, and the device 101 has been moved.

The device 101 determines the fifth horizontal angle ($\theta_5$) of a first eye of the first user 120A with respect to the line 115 perpendicular to the lenticular display 110, the sixth horizontal angle ($\theta_6$) of a first eye of the second user 120B with respect to the line 115 perpendicular to the lenticular display 110, a seventh angle ($\theta_7$) of a second eye of the first user 120A with respect to the line 115 perpendicular to the lenticular display 110, and an eighth angle ($\theta_8$) of a second eye of the second user 120B with respect to the line 115 perpendicular to the lenticular display 110.

The device 101 controls the lenticular display 110 to display the first content 130A at the fifth horizontal angle ($\theta_5$) (e.g., to the first eye of the first user 120A) and second content 130B at the sixth horizontal angle ($\theta_6$) (e.g., to the first eye of the second user 120B). The device 101 further controls the lenticular display 110 to display third content at the seventh horizontal angle ($\theta_7$) (e.g., to the second eye of the first user 120A) and fourth content at the eighth horizontal angle ($\theta_8$) (e.g., to the second eye of the second user 120B).

In various implementations, the first content 130A and the third content are different perspectives of the same object or scene. Similarly, in various implementations, the second content 130B and the fourth content are different perspectives of the same object or scene.

Figure 8:
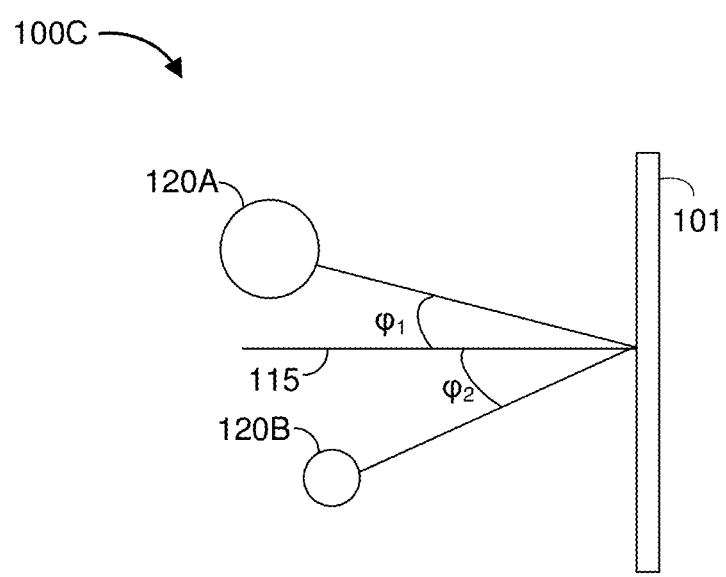
FIG. 8 illustrates a side view of the example operating environment at the third time.

FIG. 8 illustrates a side view of the example operating environment at the third time 100C. The device 101 determines a first vertical angle ($\varphi_1$) of the first user 120A with respect to the line 115 perpendicular to the lenticular display 110 and a second vertical angle ($\varphi_2$) of the second user 120B with respect to the line 115 perpendicular to lenticular display 110. The device 101 controls the lenticular display 110 to display the first content 130A at the fifth horizontal angle ($\theta_5$) (e.g., to the first user 120A) based on the first vertical angle ($\varphi_1$) and the second content 130B at the sixth horizontal angle ($\theta_6$) (e.g., to the second user 120B) based on the second vertical angle ($\varphi_2$).

As a particular example, in various implementations, the first content 130A includes a virtual three-dimensional object (e.g., a cylinder) displayed from a first horizontal perspective based on the fifth horizontal angle ($\theta_5$) and a first vertical perspective based on the first vertical angle ($\varphi_1$), the third content includes the same virtual object displayed from a second horizontal perspective based on the seventh horizontal angle ($\theta_7$) and the first vertical perspective based on the first vertical angle ($\varphi_1$), the second content 130B includes the same virtual object displayed from a third horizontal perspective based on the sixth horizontal angle ($\theta_6$) and a second vertical perspective based on the second vertical angle ($\varphi_2$), and the fourth content includes the same virtual object displayed from a fourth horizontal perspective based on the eighth horizontal angle ($\theta_8$) and the second vertical perspective based on the second vertical angle ($\varphi_2$). Thus, each user stereoscopically views a virtual three-dimensional object with the correct vertical perspective for that user.

FIG. 9 is a flowchart representation of a method 900 of operating a lenticular display in accordance with some implementations. In various implementations, the method 900 is performed by a device with one or more processors, non-transitory memory, an image sensor, and a lenticular display (e.g., the device 101 of FIG. 1). In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device capturing, using the image sensor, a first image.

The method 900 continues, in block 920, with the device determining, from the first image, a first horizontal angle of a first user at a first time with respect to a line perpendicular to the lenticular display and a first horizontal angle of a second user at the first time with respect to the line perpendicular to the lenticular display. In various implementations, the first time is when the first image is captured. For example, in FIG. 4, the device (based on an image captured using the image sensor 112) determines the first horizontal angle ($\theta_1$) and the second horizontal angle ($\theta_2$). In various implementations, the device 101 employs a face detection algorithm on the first image to determine locations in the image of the first user and the second user. The locations in the image are mapped to horizontal (and, in various implementations, vertical) angles with respect to the line perpendicular to the lenticular display.

The method 900 continues, in block 930, with the device displaying, via the lenticular display, first content at the first horizontal angle of the first user and second content, different than the first content, at the first horizontal angle of the second user.

In various implementations, the first content includes a first image and the second content includes a second image different than the first image. In various implementations, the first content includes a first video and the second content includes a second video different than the first video.

In various implementations, the first content includes a first version of content and the second content includes a second version of the content different from the first version of the content. For example, in various implementations, the second version of the content is a censored version of the first version of the content.

In various implementations, displaying the first content at the first horizontal angle of the first user includes displaying an object or scene at a first perspective and displaying the second content at the first horizontal angle of the second user includes displaying the object or scene at a second perspective different than the first perspective. For example, in FIGS. 2 and 3, the device 101 displays, for the first user 120A, a cylinder 140 from a first vertical perspective at which the top 141 is visible and displays, for the second user 120B, the cylinder 140 from a second vertical perspective at which the top 141 is not visible, but at which the bottom 142 is visible.

In various implementations, the method 900 further includes determining, based on the first image, an identity of the first user and an identity of the second user, wherein the first content is based on the identity of the first user and the second content is based on the identity of the second user. For example, in various implementations, the first user is associated with a first subscription video service account and the second user is associated with a second subscription video service account and a respective "next episode" is displayed to each user. In various implementations, the method 900 further includes determining, from the first image, a first vertical angle of the first user at the first time with respect to the line perpendicular to the lenticular display and a first vertical angle of the second user at the first time with respect to the line perpendicular to the lenticular display. For example, in FIG. 8, the device 101 determines the first vertical angle ($\varphi_1$) of the first user and the second vertical angle ($\varphi_2$) of the second user. In various implementations, wherein displaying the first content at the first horizontal angle of the first user and the second content at the first horizontal angle of the second user is based on the first vertical angle of the first user and the first vertical angle of the second user. For example, in FIGS. 2 and 3, the device 101 displays, for the first user 120A, a cylinder 140 from a first vertical perspective at which the top 141 is visible and displays, for the second user 120B, the cylinder 140 from a second vertical perspective at which the top 141 is not visible, but at which the bottom 142 is visible. Accordingly, in various implementations, displaying the first content at the first horizontal angle of the first user includes displaying an object or scene at a first vertical perspective based on the first vertical angle and displaying the second content at the first horizontal angle of the second user includes displaying the object or scene at a second vertical perspective based on the second vertical angle.

In various implementations, the first content and the second content are displayed at the same vertical perspective based on the first vertical angle and the second vertical angle. For example, in various implementations, a virtual object is displayed at a vertical perspective based on the average of the first vertical angle and the second vertical angle.

The method 900 continues, at block 940, with the device determining a second horizontal angle of the first user at a second time, different than the first time, with respect to the line perpendicular to the lenticular display and a second horizontal angle of the second user at the second time with respect to the line perpendicular to the lenticular display. For example, whereas in FIG. 4, the device 101 determines the first horizontal angle ($\theta_1$) of the first user 120A at the first time and the second horizontal angle ($\theta_2$) of the second user 120B at the first time, in FIG. 5, the device 101 determines the third horizontal angle ($\theta_3$) of the first user 120A at the second time and the fourth horizontal angle ($\theta_4$) of the second user 120B at the second time.

In various implementations, the second horizontal angle of the first user is different than the first horizontal angle of the first user. For example, in FIGS. 4 and 5, the third horizontal angle ($\theta_3$) is different than the first horizontal angle ($\theta_1$). In various implementations, the second horizontal angle of the second user is the same as the first horizontal angle of the first user. For example, in FIGS. 4 and 5, the fourth horizontal angle ($\theta_4$) is the same as the first horizontal angle ($\theta_1$).

In various implementations, the method 900 includes capturing, using the image sensor, a second image, wherein determining the second horizontal angle of the first user and the second horizontal angle of the second user is based on the second image. In various implementations, the method 900 includes receiving data from a pose estimation unit (IMU), wherein determining the second horizontal angle of the first user and the second horizontal angle of the second user is based on the data from the pose estimation unit.

The method 900 continues, in block 950, with the device displaying, via the lenticular display, the first content at the second horizontal angle of the first user and the second content at the second horizontal angle of the second user.

In various implementations, the method 900 further includes determining a third horizontal angle of the first user at the first time with respect to the line perpendicular to the lenticular display and a third horizontal angle of the second user at the first time with respect to the line perpendicular to the lenticular display. For example, in FIG. 7, the device 101 determines the seventh horizontal angle ($\theta_7$) of the first user 120A and the eighth horizontal angle ($\theta_8$) of the second user 120B. The method 900 further includes displaying, via the lenticular display, third content at the third horizontal angle of the first user and fourth content, different than the third content, at the third horizontal angle of the second user.

In various implementations, displaying the first content at the first horizontal angle of the first user includes displaying an object or scene at a first horizontal perspective based on the first horizontal angle of the first user and displaying the third content at the third horizontal angle at the third horizontal angle of the first user includes displaying the object or scene at second horizontal perspective based on the third horizontal angle of the first user.

Figure 10:
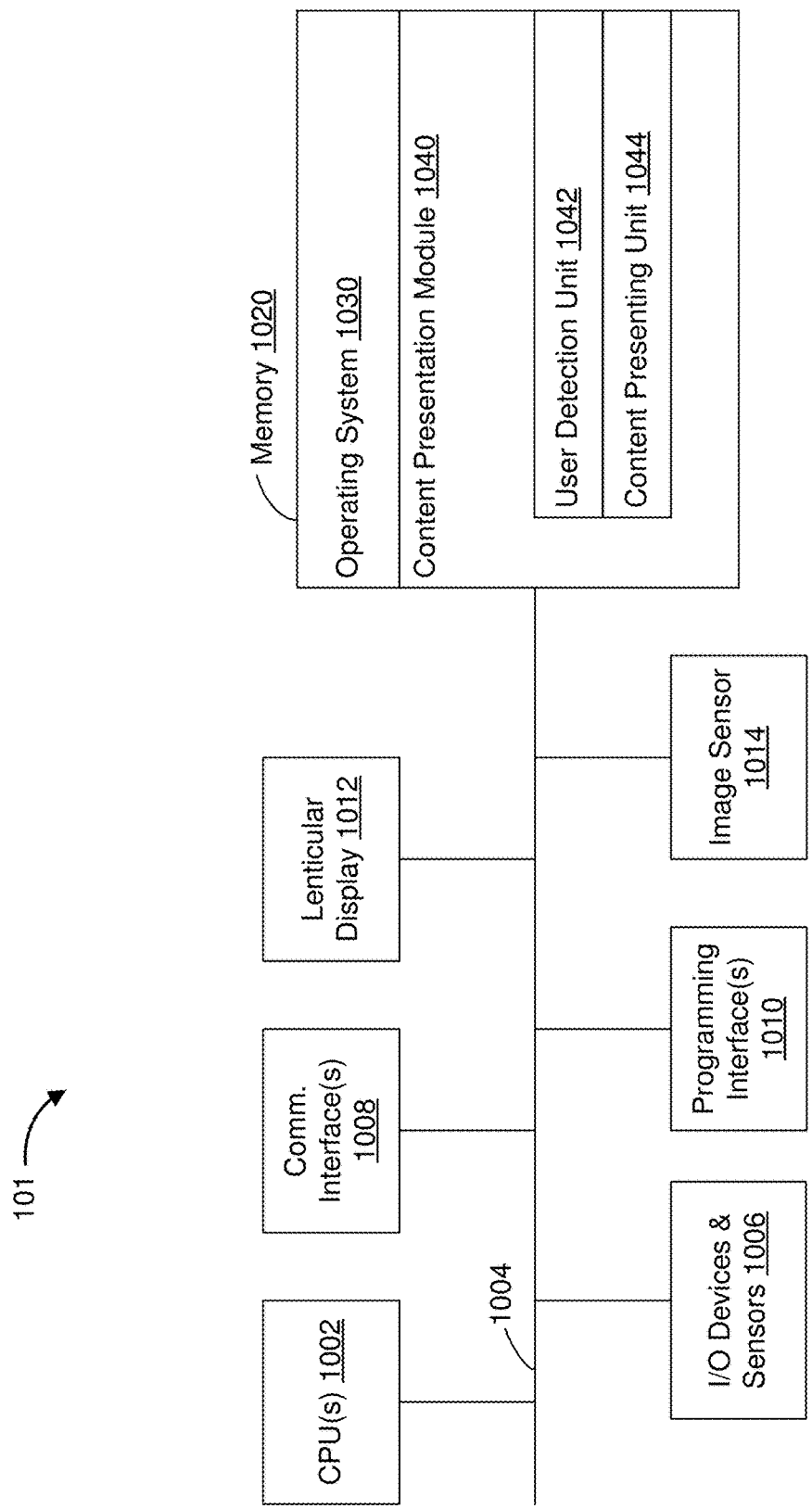
FIG. 10 is a block diagram of an example of the device of FIG. 1 in accordance with some implementations.

FIG. 10 is a block diagram of an example of the device 101 of FIG. 1 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 101 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, a lenticular display 1012, an image sensor 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a gyroscope, a thermometer, one or more microphones, one or more speakers, one or more biometric sensors (e.g., blood pressure monitor, heart rate monitor, breathing monitor, electrodermal monitor, blood oxygen sensor, blood glucose sensor, etc.), a haptics engine, one or more depth sensors (e.g., a structured light, a time-of-flight, or the like), and/or the like.

In some implementations, the lenticular display 1012 is configured to display different content to different users at different angles. In some implementations, the lenticular display 1012 includes holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the lenticular display 1012 corresponds to diffractive, reflective, polarized, holographic, etc. waveguide displays. In various implementations, the lenticular display 1012 is capable of presenting mixed reality and/or virtual reality content.

In various implementations, the image sensor 1014 includes one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and a content presentation module 1040.

The operating system 1030 includes procedures for handling various basic system services and for performing hardware dependent tasks. In some implementations, the content presentation module 1040 is configured to present different content to different users at different angles via the lenticular display 1012. To that end, in various implementations, the content presentation module 1040 includes a user detection unit 1042 and a content presenting unit 1044.

In some implementations, the user detection unit 1042 is configured to determine a first horizontal angle of a first user with respect to a line perpendicular to the lenticular display 1012 and a second horizontal angle of a second user with respect to the line perpendicular to the lenticular display 1012. To that end, in various implementations, the user detection unit 1042 includes instructions and/or logic therefor, and heuristics and metadata therefor.

In some implementations, the content presenting unit 1044 is configured to display, via the lenticular display, first content at the first horizontal angle of the first user and second content, different than the first content, at the first horizontal angle of the second user. To that end, in various implementations, the content presenting unit 1044 includes instructions and/or logic therefor, and heuristics and metadata therefor.

Although the user detection unit 1042 and the content presenting unit 1044 are shown as residing on a single device (e.g., the device 101 of FIG. 1), it should be understood that in other implementations, the user detection unit 1042 and the content presenting unit 1044 may be located in separate computing devices.

Moreover, FIG. 10 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including one or more processors, non-transitory memory, an image sensor and a lenticular display:
capturing, using the image sensor, a first image;
determining, from the first image, a first horizontal angle of a first user at a first time with respect to a line perpendicular to the lenticular display and a first horizontal angle of a second user at the first time with respect to the line perpendicular to the lenticular display;

displaying, via the lenticular display, first content at the first horizontal angle of the first user and second content, different than the first content, at the first horizontal angle of the second user;

determining a second horizontal angle of the first user at a second time, different than the first time, with respect to the line perpendicular to lenticular display and a second horizontal angle of the second user at the second time with respect to the line perpendicular to the lenticular display; and displaying, via the lenticular display, the first content at the second horizontal angle of the first user and the second content at the second horizontal angle of the second user.

2. The method of claim 1, wherein the first content includes a first image and the second content includes a second image different than the first image.

3. The method of claim 1, wherein the first content includes a first video and the second content includes a second video different than the first video.

4. The method of claim 1, wherein the first content includes a first version of content and the second content includes a second version of the content different from the first version of the content.

5. The method of claim 4, wherein the second version of the content is a censored version of the first version of the content.

6. The method of claim 1, wherein displaying the first content at the first horizontal angle of the first user includes displaying an object or a scene at a first perspective and displaying the second content at the first horizontal angle of the second user includes displaying the object or the scene at a second perspective different than the first perspective.

7. The method of claim 1, further comprising determining, based on the first image, an identity of the first user and an identity of the second user, wherein the first content is based on the identity of the first user and the second content is based on the identity of the second user.

8. The method of claim 1, further comprising determining, from the first image, a first vertical angle of the first user at the first time with respect to the line perpendicular to the lenticular display and a first vertical angle of the second user at the first time with respect to the line perpendicular to the lenticular display, wherein displaying the first content at the first horizontal angle of the first user and the second content at the first horizontal angle of the second user is based on the first vertical angle of the first user and the first vertical angle of the second user.

9. The method of claim 8, wherein displaying the first content at the first horizontal angle of the first user includes displaying an object or a scene at a first vertical perspective based on the first vertical angle and displaying the second content at the first horizontal angle of the second user includes displaying the object or the scene at a second vertical perspective based on the second vertical angle.

10. The method of claim 8, wherein the first content and second content are displayed at a same vertical perspective based on the first vertical angle of the first user and the first vertical angle of the second user.

11. The method of claim 8, further comprising determining a second vertical angle of the first user at the second time with respect to the line perpendicular to the lenticular display and a second vertical angle of the second user at the second time with respect to the line perpendicular to the lenticular display, wherein displaying the first content at the second horizontal angle of the first user and the second content at the second horizontal angle of the second user is based on the second vertical angle of the first user and the second vertical angle of the second user.

12. The method of claim 1, further comprising:

determining a third horizontal angle of the first user at the first time with respect to the line perpendicular to the lenticular display and a third horizontal angle of the second user at the first time with respect to the line perpendicular to the lenticular display; and displaying, via the lenticular display, third content at the third horizontal angle of the first user and fourth content, different than the third content, at the third horizontal angle of the second user.

13. The method of claim 12, wherein displaying the first content at the first horizontal angle of the first user includes displaying an object or a scene at a first horizontal perspective based on the first horizontal angle of the first user and displaying the third content at the third horizontal angle of the first user includes displaying the object or the scene at a second horizontal perspective based on the third horizontal angle of the first user.

14. The method of claim 1, wherein the second horizontal angle of the first user is different than the first horizontal angle of the first user.

15. The method of claim 1, wherein the second horizontal angle of the second user is the same as the first horizontal angle of the first user.

16. The method of claim 1, further comprising capturing, using the image sensor, a second image, wherein determining the second horizontal angle of the first user and the second horizontal angle of the second user is based on the second image.

17. The method of claim 1, further comprising receiving data from a pose estimation unit, wherein determining the second horizontal angle of the first user and the second horizontal angle of the second user is based on the data from the pose estimation unit.

18. A device comprising:

an image sensor;

a lenticular display; and a non-transitory memory; and one or more processors to:

capture, using the image sensor, a first image;

determine, from the first image, a first horizontal angle of a first user at a first time with respect to a line perpendicular to the lenticular display and a first horizontal angle of a second user at the first time with respect to the line perpendicular to the lenticular display;

display, via the lenticular display, first content at the first horizontal angle of the first user and second content, different than the first content, at the first horizontal angle of the second user;

determine a second horizontal angle of the first user at a second time, different than the first time, with respect to the line perpendicular to the lenticular display and a second horizontal angle of the second user at the second time with respect to the line perpendicular to the lenticular display; and display, via the lenticular display, the first content at the second horizontal angle of the first user and the second content at the second horizontal angle of the second user.

19. The device of claim 18, wherein the one or more processors are further to determine, from the first image, a first vertical angle of the first user at the first time with respect to the line perpendicular to the lenticular display and a first vertical angle of the second user at the first time with respect to the line perpendicular to the lenticular display,
   wherein the one or more processors are to display the first content at the first horizontal angle of the first user by displaying an object or a scene at a first vertical perspective based on the first vertical angle and are to display the second content at the first horizontal angle of the second user by displaying the object or the scene at a second vertical perspective based on the second vertical angle.

20. A non-transitory memory storing one or more programs, which, when executed by one or more processors of a device with an image sensor and a lenticular display cause the device to:
   capture, using the image sensor, a first image;
   determine, from the first image, a first horizontal angle of a first user at a first time with respect to a line perpendicular to the lenticular display and a first horizontal angle of a second user at the first time with respect to the line perpendicular to the lenticular display;
   display, via the lenticular display, first content at the first horizontal angle of the first user and second content, different than the first content, at the first horizontal angle of the second user;
   determine a second horizontal angle of the first user at a second time, different than the first time, with respect to the line perpendicular to the lenticular display and a second horizontal angle of the second user at the second time with respect to the line perpendicular to the lenticular display; and
   display, via the lenticular display, the first content at the second horizontal angle of the first user and the second content at the second horizontal angle of the second user.

* * * * *